(12) United States Patent
Wang

(10) Patent No.: US 7,637,971 B2
(45) Date of Patent: Dec. 29, 2009

(54) HYDROGEN FUEL SUPPLY SYSTEM

(76) Inventor: Hsu Yang Wang, 8FL., No. 28, Alley 7, Lane 128, Liansing St., Sijhih City, Taipei County (TW)

( * ) Notice: Subject to any disclaimer, the term of this patent is extended or adjusted under 35 U.S.C. 154(b) by 416 days.

(21) Appl. No.: 11/168,541

(22) Filed: Jun. 29, 2005

(65) Prior Publication Data

US 2007/0000454 A1 Jan. 4, 2007

(51) Int. Cl.
*B01J 7/00* (2006.01)
*B01J 19/08* (2006.01)
*B01J 10/00* (2006.01)

(52) U.S. Cl. .................. 48/61; 422/186; 422/187; 422/188; 422/198

(58) Field of Classification Search ............. 422/186, 422/187, 188, 198; 48/61
See application file for complete search history.

(56) References Cited

U.S. PATENT DOCUMENTS

| | | | |
|---|---|---|---|
| 5,409,784 A | 4/1995 | Bromberg | |
| 5,425,332 A | 6/1995 | Rabinovich | |
| 5,887,554 A | 3/1999 | Cohn | |
| 5,897,970 A * | 4/1999 | Isomura et al. | 429/9 |
| 6,802,876 B1 * | 10/2004 | Kobayashi et al. | 48/127.9 |
| 2003/0143442 A1 * | 7/2003 | Daniel et al. | 429/17 |
| 2004/0057842 A1 * | 3/2004 | Miura et al. | 417/254 |
| 2004/0099226 A1 | 5/2004 | Bromberg | |
| 2004/0192044 A1 * | 9/2004 | Degertekin et al. | 438/689 |

FOREIGN PATENT DOCUMENTS

| | | |
|---|---|---|
| EP | 1392087 | 2/2004 |
| FR | 2757499 | 6/1998 |
| JP | 2004342390 | 12/2004 |
| WO | 2004043589 | 5/2004 |

* cited by examiner

*Primary Examiner*—Walter D Griffin
*Assistant Examiner*—Lessanework Seifu
(74) *Attorney, Agent, or Firm*—Lowe Hauptman Ham & Berner, LLP (57) ABSTRACT

A hydrogen fuel supply system comprising a methanol aqueous solution particulates generator, spark-plasma heater, catalytic reactor, hydrogen separation unit, hydro-evaporating cooler, hydrogen compressor, hydrogen injection system, etc. By properly mixing methanol and water to form a methanol aqueous solution, then vibrated by a methanol aqueous solution particulates generator to form micro to nano sized particulates of aqueous-methanol, and the micro to nano sized particulates is then heated in high temperature by a spark-plasma heater, then through a catalytic reactor to form a gaseous mixture of hydrogen, carbon dioxide, and nitrogen. Then the hydrogen is separated by a hydrogen separation unit. Finally, the hydrogen is chilled by a hydro-evaporation cooler and then compressed by a hydrogen compressor. The resulting hydrogen can be supplied to hydrogen internal-combustion engines or hydrogen power generators by hydrogen injection systems.

13 Claims, 8 Drawing Sheets

HYDROGEN FUEL SUPPLY SYSTEM

BACKGROUND OF THE INVENTION

1. Field of the Invention

The present invention relates to a hydrogen fuel supply system, particularly to a hydrogen fuel supply system that consists of a methanol aqueous solution particulate generator, a spark-plasma heater, a catalytic reactor, a hydrogen separation unit, a hydro-evaporation cooler, a hydrogen compressor and a hydrogen injection system etc. Such that the system volume for generating hydrogen can be greatly reduced, the efficiency for generating hydrogen can be higher, and the hydrogen can be supplied to hydrogen internal-combustion engines or hydrogen power generators for people's utilizations.

2. Description of the Prior Art

It is known that hydrogen is an energy and abundantly in nature. However, it is the lightest element and difficult for storage. Therefore, it is compressed and cooled as liquid hydrogen. Because the processes for storing hydrogen are very complicated, then the cost for obtaining hydrogen is also very high.

There is a method for obtaining hydrogen from changing property of methanol by steam; the reaction is shown as formula (I)

$$CH_3OH \rightarrow CO + 2H_2$$

$$CO + H_2O \rightarrow CO_2 + H_2$$

$$2CH_3OH + H_2O \rightarrow [CO + CO_2] + 5H_2$$

Although the above shown reaction is known for years, there are some problems that can not be overcome, thus the reaction can not be utilized in industrial equipment, such as hydrogen internal-combustion engines or hydrogen power generators . . . etc.

SUMMARY OF THE DISCLOSURE

The main object of present invention is to provide a hydrogen fuel supply system. By using the hydrogen fuel supply system of the present invention, after hydrogen is separated out from conversion of micro-particulates of aqueous-methanol. In combination with a hydrogen cooler, compressor and injector, the resulting hydrogen can be quickly supplied to hydrogen internal-combustion engines or hydrogen power generators.

The second object of present invention is to provide a hydrogen fuel supply system consisting of a methanol aqueous solution particulate generator, a spark-plasma heater, a catalytic reactor, a hydrogen separation unit, a hydro-evaporation cooler, a hydrogen compressor and a hydrogen injection system etc. By using a methanol aqueous solution particulate generator to oscillate methanol aqueous solution to form micro-particulates of aqueous-methanol, and it is then injected into a spark-plasma heater for high temperature heating, and introduce small quantity of air and heat needed for combustion of methanol, through a catalytic reactor to form a gaseous mixture of hydrogen, carbon dioxide and nitrogen. Then the hydrogen is separated out by a hydrogen separation unit. After that, the hydrogen is chilled by a hydro-evaporating cooler and then compressed by a hydrogen compressor. The resulting hydrogen then can be supplied to hydrogen internal-combustion engines or hydrogen power generators for utilization.

According to the hydrogen fuel supply system of the present invention, the micro-particulates of aqueous-methanol formed by oscillating a methanol aqueous solution with a methanol aqueous solution particulate generator forming an average diameter smaller than 3 μm, then the reaction speed can be expedited and the reaction efficiency can be increased, this is an another object of present invention.

According to the hydrogen fuel supply system of the present invention, the temperature of the reactor can be raised by regulating the combustion of the methanol in oxygen and air. This is another object of the present invention.

According to the hydrogen fuel supply system of the present invention, by using a spark-plasma heater, the functions of ions, electrons, radicals in plasma can be used to expedite the reaction speed, during the life of the catalysts, then to reduce the costs of catalysts, this is a further object of the present invention.

According to the hydrogen fuel supply system of the present invention, by using the hydro-evaporating cooler to chill the hydrogen, it will be more effective, and the energy consumption will be reduced, in comparison with traditional cooler, this is also an another object of present invention.

Consequently, the present invention is achieved by the technical means as follows:

A hydrogen fuel supply system comprising a methanol aqueous solution particulate generator, park-plasma heater, catalytic reactor, hydrogen separation unit, hydro-evaporating cooler, hydrogen compressor hydrogen injection system, etc. By properly mixing methanol solution and water to form a methanol aqueous solution, the solutions are vibrated by an ultrasonic oscillator, and the methanol aqueous solution particulate is heated to a high temperature by a spark-plasma heater, then reacted through a catalytic reactor to form a gaseous mixture of $H_2$, $CO_2$ & $N_2$. The resulting hydrogen can by supplied to hydrogen internal-combustion engines or hydrogen power generators by hydrogen injection systems. The hydrogen fuel supply system is operated under reaction conditions of the temperature about 300° C. to 460° C., and the time about 50 to 300 μsec, the micro-particulates of methanol aqueous solution produce 56.3-65.1% $H_2$+20.7-23.7% $CO_2$+11.1-21.1% $N_2$.

The present invention also can be achieved by the following technical means:

Said methanol aqueous solution particulate generator is a micro injector of high efficiency, and the methanol aqueous solution can be converted into micro to nano sized particles of mist with high frequency of electricity.

Said micro-particulates of aqueous-methanol are injected into a plasma region formed due to discharging between electrode gaps of spark plug, then the heating of plasma collision and partial oxidation are performed, and the reaction is generated.

Said gap between anode of the spark plug and external cathode generates electric current stream and then release electrons, then the high temperature gases can be ionized further, so as to expedite re-organizing reaction.

Said micro-particulates of methanol aqueous solution are heated by spark-plasma heater before it reacts with catalyst, then it performs pre-reaction.

Before said micro-particulates of methanol aqueous solution react with catalyst, it is heated by spark-plasma heater, such that it performs a pre-reaction.

After said micro-particulates of methanol aqueous solution is heated by spark-plasma heater, it is induced to a catalyst reactor for reactor and then, it is converted to a gaseous mixture consisting of $H_2$, $CO_2$ and $N_2$. This process uses catalyst of Ni as radical under operation temperature between 300° C. to 460° C.

When said catalyst reactor is performed under reaction conditions of the temperature about 300° C. to 460° C., and the time about 50 to 300 μsec, the micro-particulates of methanol aqueous solution shall produce 56.3-65.1% $H_2$+20.7-23.7% $CO_2$+11.1-21.1% $N_2$.

Said hydrogen separation unit is performed by using a function that, if the densities of $N_2$ and $CO_2$ are greater than that of $H_2$ 13.9 times, then $H_2$ is easy to float above $N_2$ and $CO_2$. And, a hydrogen permeating film made of ceramic is provided for purified separation of hydrogen.

Said processes can use a programmable logic controller to control the mixed ratio of methanol and water, the generation of an another object of present invention, heating and hydrogen separation, so as to achieve the reaction of the following formula (II): $4CH_3OH+3H_2O+½O_2 \rightarrow 4CO_2+11H_2$. Furthermore, by controlling the operations of temperature sensor, hydro-evaporating cooler, hydrogen compressor, air flow rate detector, engine rpm detector and hydrogen injector, the backfiring and pre-ignition of hydrogen shall be prevented. In addition, the efficiencies of hydrogen internal-combustion engines and hydrogen power generators will be optimized and, the $NO_x$ emission will be decreased.

The volume ratio of said methanol in said methanol aqueous solution is controlled under 57.1-75.5%, so as to control the optimal condition of $H_2$ production under proper temperature.

Said system also may comprise a water tank, to provide for the storage of reaction water.

Said system also may comprise a hydrogen internal combustion engine or hydrogen power generator, so as to work with generated steam and electric source.

Said system also may comprise a power supply, so as to supply electricity needed by spark ignition and electric appliances.

Said system also may comprise a chip having functions of oscillators and piezoelectric transducers for generating high frequency vibration energy, such that the methanol aqueous solution would become micro to nano-sized particulates in a mist.

The installation angle for said chip having functions of oscillators and piezoelectric transducers of said system will be changed in accordance with the corresponding position of spark plasma heater, its angle is changed from 6° to 45°.

Said system also may comprise a fan set for providing oxygen needed for a partial oxidation reaction.

Said system also may comprise a gas inlet controller for precisely controlling the molecular ratio of air needed for oxidation reaction in the range of 25.3-44.2%.

Said system also may comprise a water column stopper.

Said system also may comprise a battery set for storing electric power for starting and stopping the system.

Said system also may comprise an ignition system for controlling continuous ignitions of sparks.

A more complete understanding of there and other features and advantages of the present invention will become apparent from a careful consideration of the following detailed description of certain embodiments illustrated in the accompany drawings.

BRIEF DESCRIPTION OF THE DRAWINGS

The above object and advantages of the present invention will become more apparent by describing in detail-preferred embodiments thereof with reference to the attached drawings in which.

DETAILED DESCRIPTION OF THE PREFERRED EMBODIMENT

Figure 1:
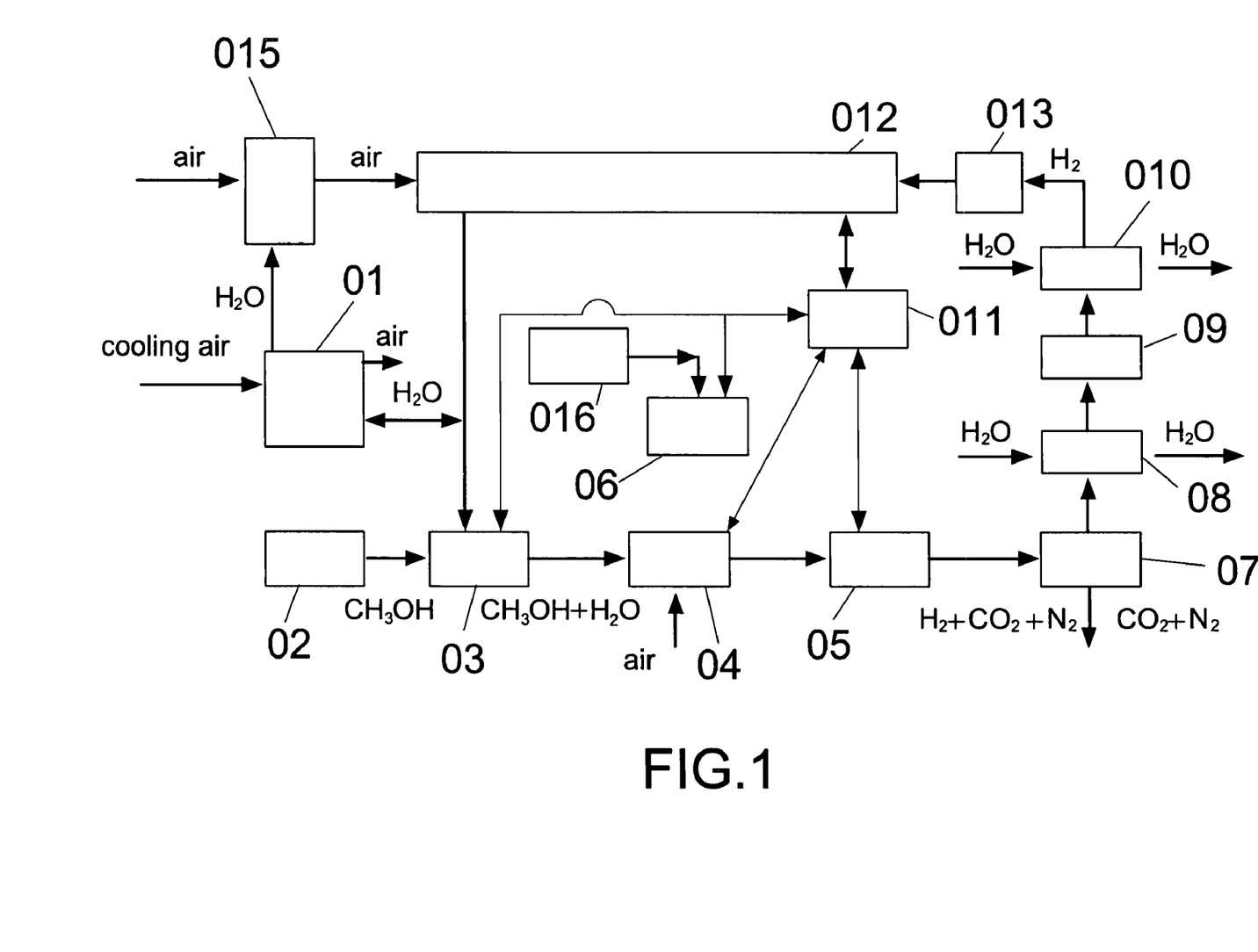
FIG. 1 is a block diagram showing the functions of the present invention.

As shown in FIG. 1, the hydrogen fuel supply system of the present invention comprises a water tank 01, a methanol tank 02, a micro-particulates generator of methanol aqueous solution 03, a spark-plasma heater 04, a catalyst reactor 05, a spark ignition system 06, a hydrogen separation unit 07, a first hydro-evaporation cooler 08, a hydrogen compressor 09, a second hydro-evaporation cooler 010 and a programmable logic controller 011. By properly mixing methanol solution and water to form a methanol aqueous solution, that is vibrated by an ultrasonic oscillator, and the methanol aqueous solution particulate is heated to a high temperature by a spark-plasma heater, then reacted through a catalytic reactor to form a gaseous mixture of $H_2$, $CO_2$ & $N_2$. The resulting hydrogen can by supplied to a hydrogen internal-combustion engines or hydrogen power generators by hydrogen injection systems. The hydrogen fuel supply system, wherein when said catalyst reactor is performed under reaction conditions of the temperature about 300° C. to 460° C., and the time about 50 to 300 μsec, the micro-particulates of methanol aqueous solution shall produce 56.3-65.1% $H_2$+20.7-23.7% $CO_2$+11.1-21.1% $N_2$.

The above mentioned reaction is an auto-thermal re-composite reaction of methanol steam; it is composited from the following reaction (1), the reaction of methanol steam reforming, and reaction (2), partial oxidation of methanol. This formula was provided by Johnson-Matthey in the end of 1980.

The reaction of methanol steam reforming $$CH_3OH+H_2O \rightarrow 3H_2+CO_2 \quad (1)$$

Partial oxidation of methanol $$CH_3OH+½O_2 \rightarrow 2H_2+CO_2 \quad (2)$$

Then the reaction of present invention becomes (1)+(2)

$$4CH_3OH+3H_2O+½O_2 \rightarrow 4CO_2+11H_2 \quad (3)$$

Figure 2:
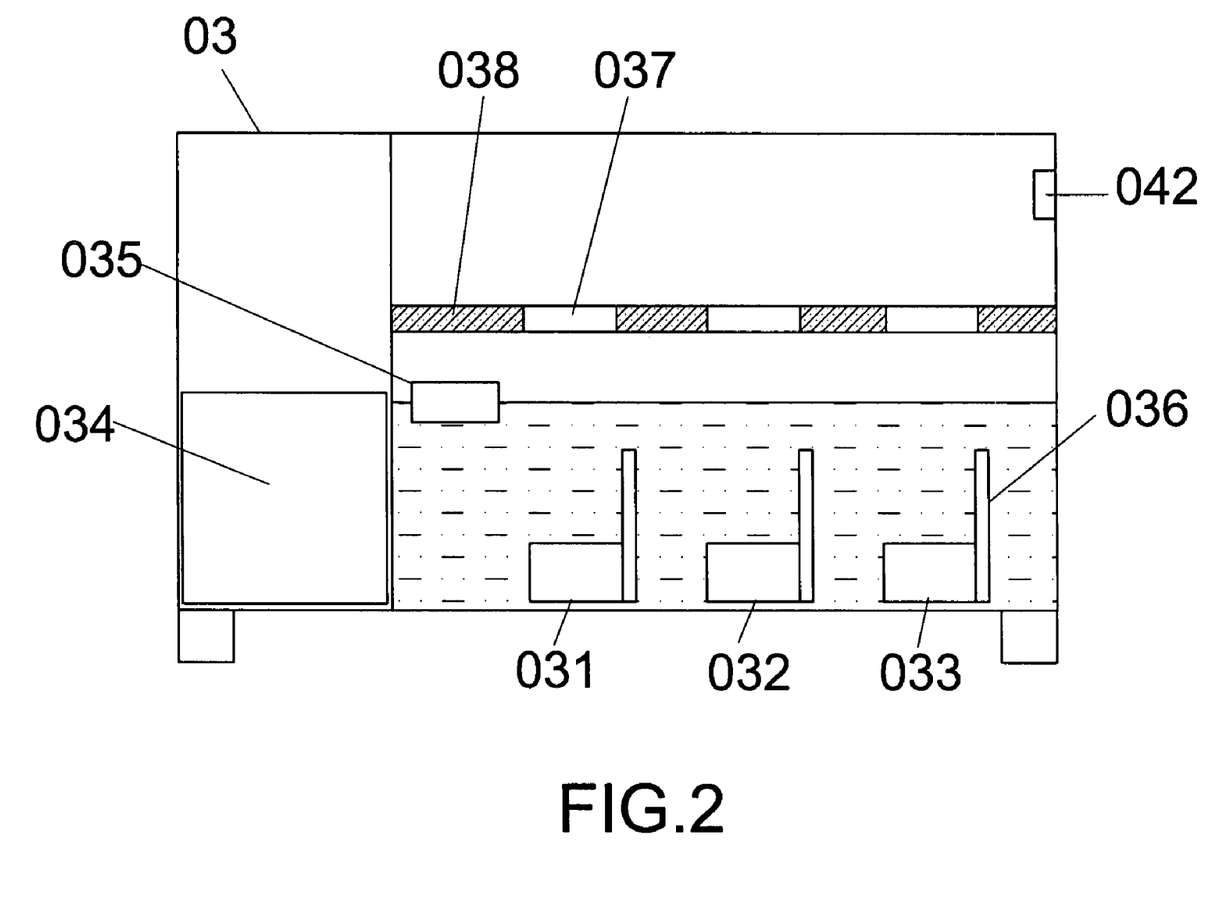
FIG. 2 is a diagram showing the construction of micro-particulates generator of methanol aqueous solution.

The detailed descriptions of the preferred embodiment of present invention are stated as follows:

The water inside a water tank 01 and a methanol inside tank 02, are controlled by a programmable logic controller 011 to form a methanol aqueous solution with proper volume ratio, then, said aqueous solution is conducted into a micro-particulates generator of methanol aqueous solution 03, said a micro-particulates generator of methanol aqueous solution 03 is a micro-particulates injector, as shown in FIG. 2, a plurality of oscillators 031, 032, 033 formed by piezoelectric chips are installed inside said injector. By using an oscillator circuit controller 034, current pulse will be generated and applied a signal with 24 to 48 volt of electric voltage and 500 $KH_Z$ to 250 $MH_Z$ of frequency to said oscillators, then the methanol aqueous solution is reacted to form micro-particulates of methanol aqueous solution. As shown in said FIG. 2, inside a micro-particulates generator of methanol aqueous solution 03, at a position of proper height, there is a liquid-level controller 035, such that the methanol aqueous solution can be maintained at a level with fixed height. Between each two oscillators 031, 032, 033, a vertical solution column stopper 036 is installed, so as to maintained a definite quantity of methanol aqueous solution above said each two oscillators 031, 032, 033. Such that when micro-particulates generator of methanol aqueous solution 03 is declined, the generation of micro-particulates of methanol aqueous solution would not be prevented. While at the upper end of each two oscillators 031, 032, 033, there are a plurality of path holes 037 for micro-particulates.

Figure 3:
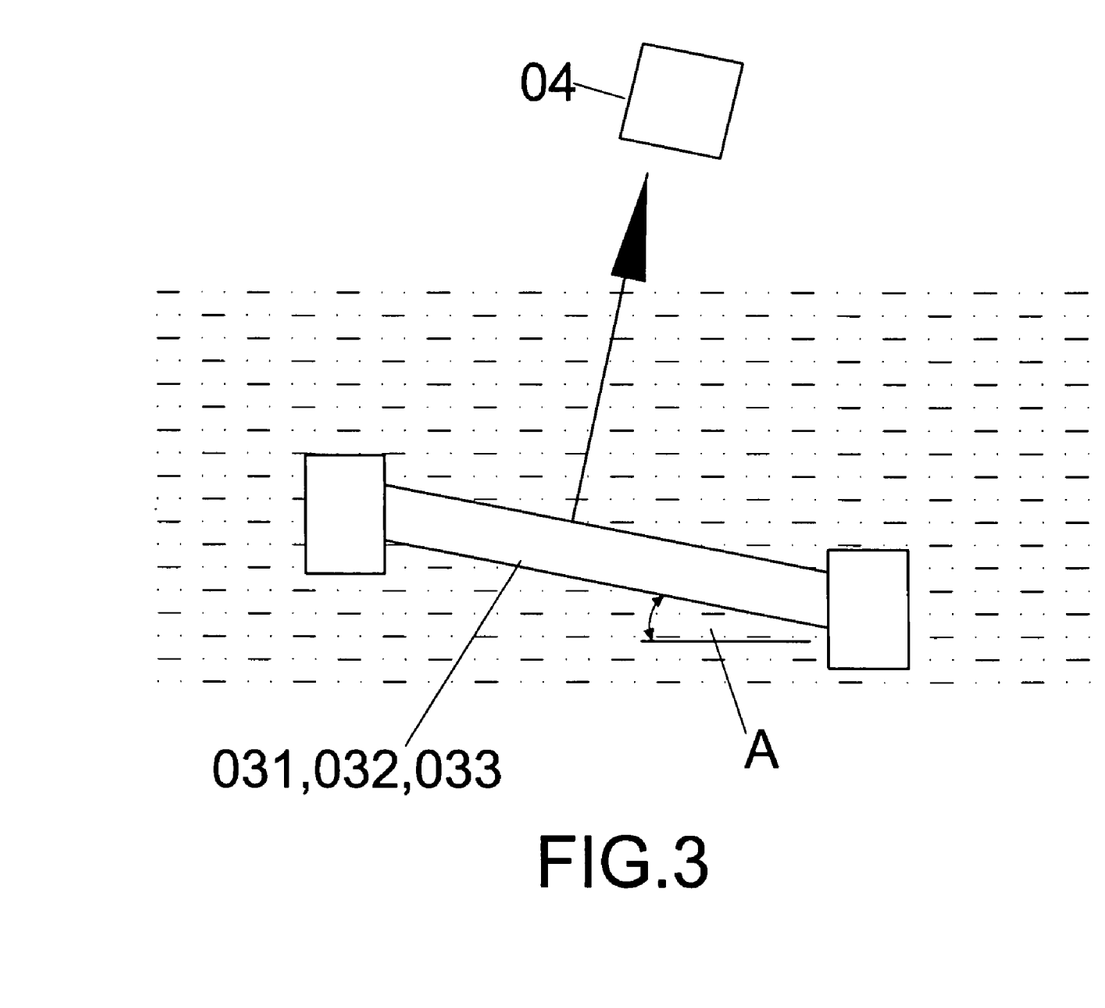
FIG. 3 is a diagram showing the relation between the piezoelectric transducer inside micro-particulates generator of methanol aqueous solution and its installation angle.

As shown in FIG. 3, the oscillators 031, 032, 033 are installed inside the micro-particulates generator of methanol aqueous solution 03 with a declined angle A, considering the direction of material particulates injection and the position of a spark-plasma heater 04, the inclined angle can be adjusted from 6° to 50°.

Figure 4A:
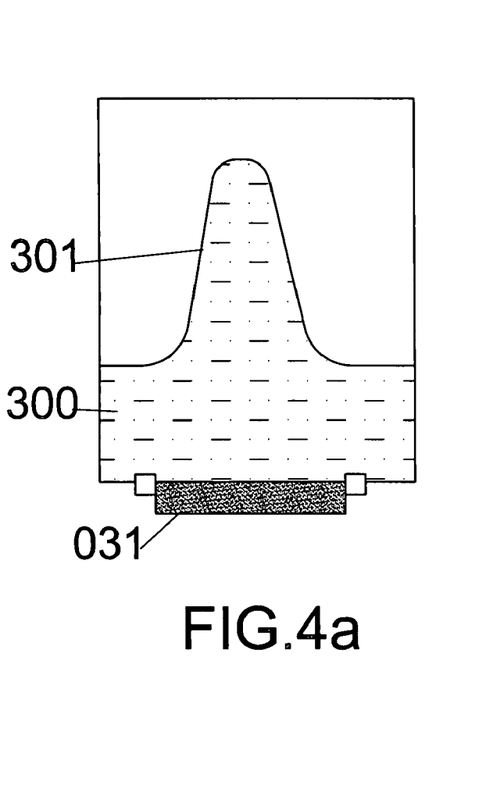
FIG. 4a is a diagram showing the first operation example of oscillator inside micro-particulates generator of methanol aqueous solution.
Figure 4B:
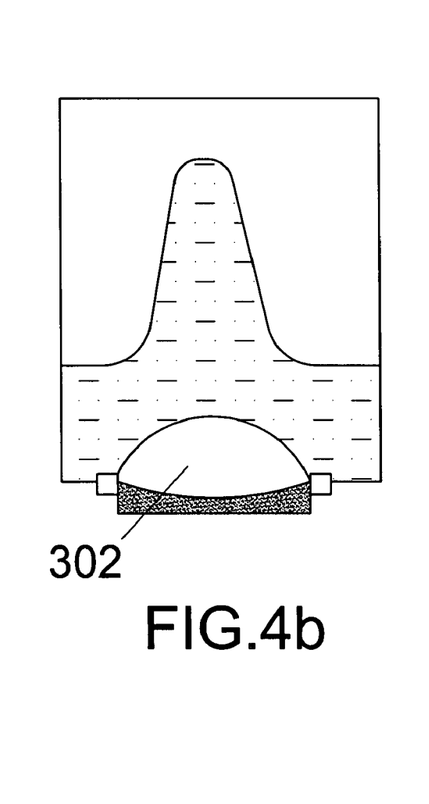
FIG. 4b is a diagram showing the second operation example of oscillator inside micro-particulates generator of methanol aqueous solution.
Figure 4C:
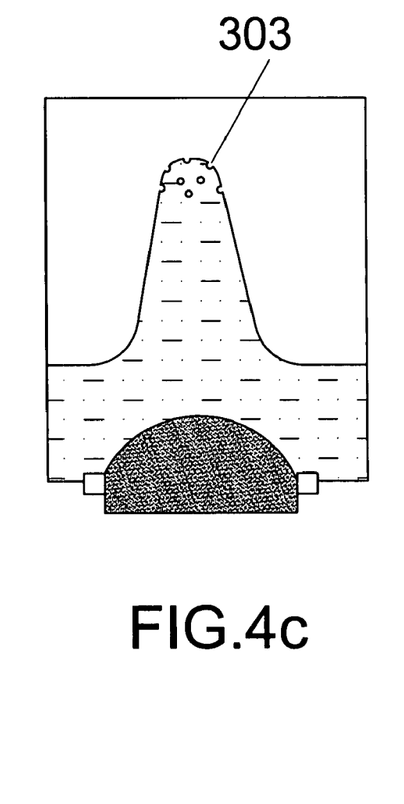
FIG. 4c is a diagram showing the third operation example of oscillator inside micro-particulates generator of methanol aqueous solution.

The functions of the micro-particulates generator of methanol aqueous solution 03 are now stated as follows: as shown in FIG. 2, when oscillator 031 oscillates its surface with high speed, because of inertia of the methanol aqueous solution 300, it is unable to follow the oscillation frequency, then when electricity is applied to the oscillator 031, the methanol aqueous column 301 then generated on the oscillator 031 (as shown in FIG. 4a), when the amplitude of the oscillator 031 is negative, because the methanol aqueous solution cannot follow the movement, then an instant vacuum 302 is generated (as shown in FIG. 4b), then bubbles are produced. During the positive amplitude of oscillator 031, the bubbles would be pushed to the edges of the methanol aqueous column 301 and broken to very small particulates 303 (as shown in FIG. 4c).

After oscillation of the oscillator 031, the particles of methanol aqueous solution becomes smaller and the most ideal condition is: 1 mole of $H_2O$, the volume is 18 c.c. if the particle becomes as small as gases. Its volume then becomes 22.4 liters, the generated air pressure will be greater than the environment, therefore, the particles of methanol aqueous solution 303 would be pushed outward due to pressure difference and the air flow enters into the micro-particulates generator of methanol aqueous solution 03, while aqueous solution column 301 would be stopped by a vertical solution column stopper 036 or solution rocking preventing plate 038 and go back to the solution surface for the next oscillation.

The average diameter of the particles of methanol aqueous solution is smaller than 3 μm, measured by Insitece Laser Refraction Particle Diameter Analyst and calculated by geometric average calculating method, surface area calculating method and mathematic average value calculating method.

Figure 5:
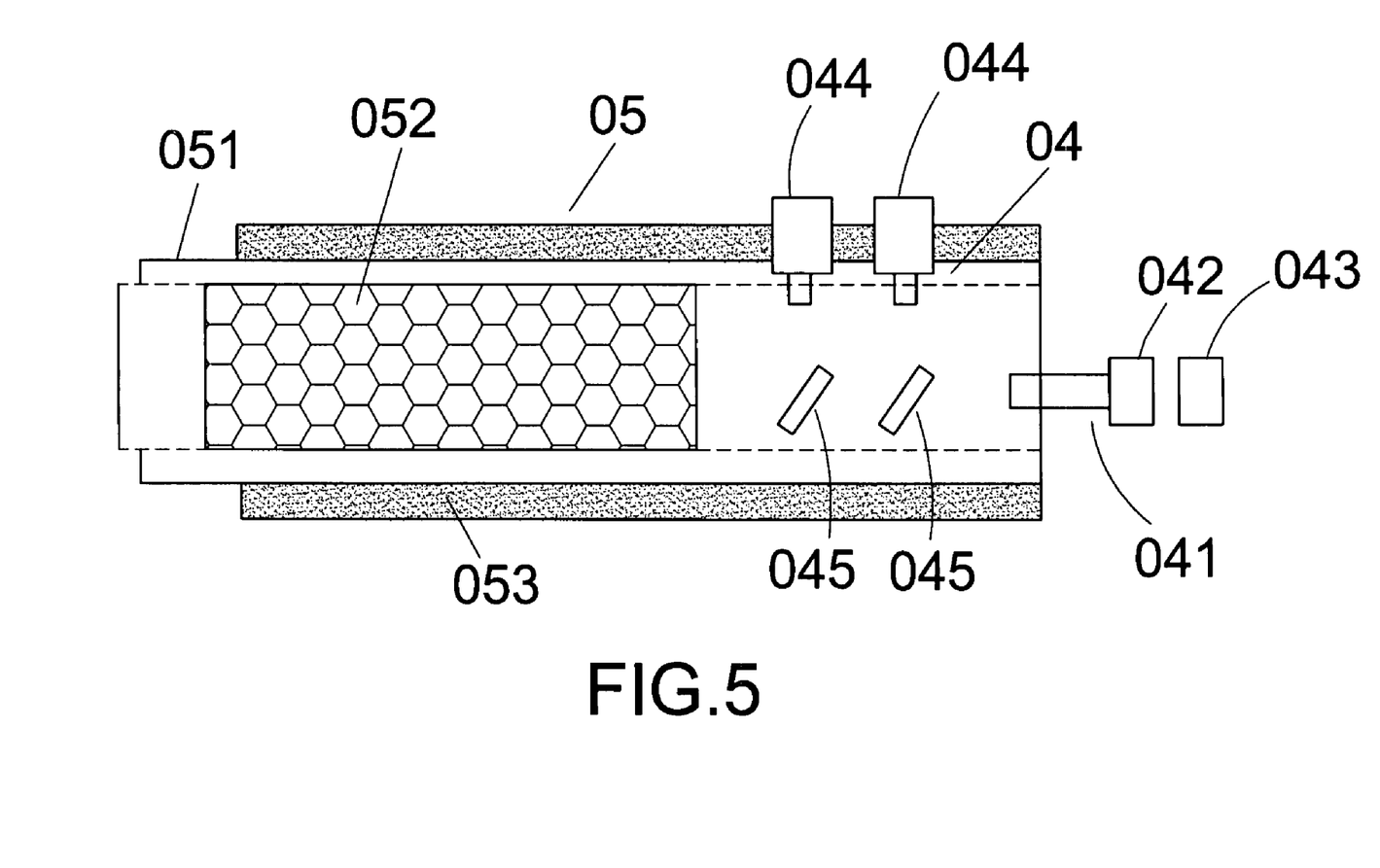
FIG. 5 is a diagram showing the structure of catalyst reactor.

The micro-particulates generator of methanol aqueous solution 03 includes a liquid level controller 035 to control the methanol aqueous solution at a position of 30 mm to 45 mm above each two oscillators 031, 032, 033, if the liquid level is very low, by the operation of a programmable logic controller 012, the methanol in a methanol tank 02 and the water in a water tank 01 would be conducted to a micro-particulates generator of methanol aqueous solution 03, if there is no methanol in the tank 02, the micro-particulates generator of methanol aqueous solution 03 would be turned off, so as to avoid over-heating After the formation of methanol aqueous solution particulates, it is conducted into a spark plasma heater 04. As shown in FIG. 5, at one end of said spark plasma heater 04, an air inlet 041 having a gas inlet controller 042 is installed, there is also a fan set 043 for controlling the air to be conducted into said spark plasma heater 04. The air inlet 041 also can be used to conduct methanol aqueous solution particulates. The other end of the spark plasma heater 04 has been installed with a spark plug 044. There is also a spark plug exterior link cathode 045 installed on the inner wall of the spark plasma heater 04. Inside said spark plasma heater 04, discharging between electrode gaps of spark plug 044 forms a plasma region. The spark plug 044 can be a spark plug of heavy-duty. When the gap between anode and cathode is adjusted to be larger, the plasma energy will be increased.

Furthermore, the inner wall of the spark plasma heater 04 is coated with a $Si_3N_4$ layer or BN layer.

By using the spark-plasma heater 04, the methanol aqueous solution particulates and proper quantity of air is heated by generated sparks. Said spark-plasma heater 04 is able to control continuous ignitions of sparks, by the chemical reaction of formula (2), so that sufficient temperature is provided for catalyst steam reactor 05, and then, the temperature will increase to 400° C., at the same time, the plasma performs ignition to flowing gases of methanol aqueous solution particulates mixture. Thus when the methanol steam is converted into gas full of hydrogen through the reaction of formula (1), the conversion of hydrogen shall be expedited after the mixing of flowing methanol aqueous particulates. Therefore, said a spark-plasma heater 04 has the functions of raising the temperature and promoting the conversion of active methanol into gases full of hydrogen. Furthermore, before the methanol steam mixture reacts with catalyst, through a similar discharging of plasma, the methanol will perform a pre-reaction.

As shown in FIG. 5, after the methanol aqueous particulates heated by the spark-plasma heater 04 is conducted into the catalyst reactor 05 for reaction. Said catalyst reactor 05 is a reaction pipe 051 having a plurality of metallic honeycomb construction or ceramic honeycomb construction 052. Outside the reaction pipe 051, it is enveloped with high temperature insulation material 053, the catalyst reactor 05 having a dimension same as the spark-plasma heater 04, and its inner wall is coated with a $Si_3N_4$ layer or a BW layer. While the above said honeycomb construction 052 is coated a Nickel-based catalyst. Said Nickel-based catalyst with Nickel as basic material is coated over the honeycomb construction 052. Through this construction, when the methanol aqueous solution particulates is induced to catalyst reactor 05 to react with said catalyst, a reaction then is performed between 300° C. to 460° C., and a mixed gas consisting of $H_2$, $CO_2$ & $N_2$ is obtained.

This catalyst reactor 05 is operated at a definite temperature and in a range of contact time. If it is operated under a temperature below 300° C., the needed reaction time is 300 μsec, if the reaction time be shorter as to 50 μsec, then the reaction temperature has to be over 375° C.

Under the reaction conditions of the temperature about 300° C. to 460° C., and the time about 50 to 300 μsec, the reaction of methanol aqueous solution particulate shall generate 56.3-65.1%, $H_2$+20.7-23.7% $CO_2$+11.1-21.1%. $N_2$.

Figure 6:
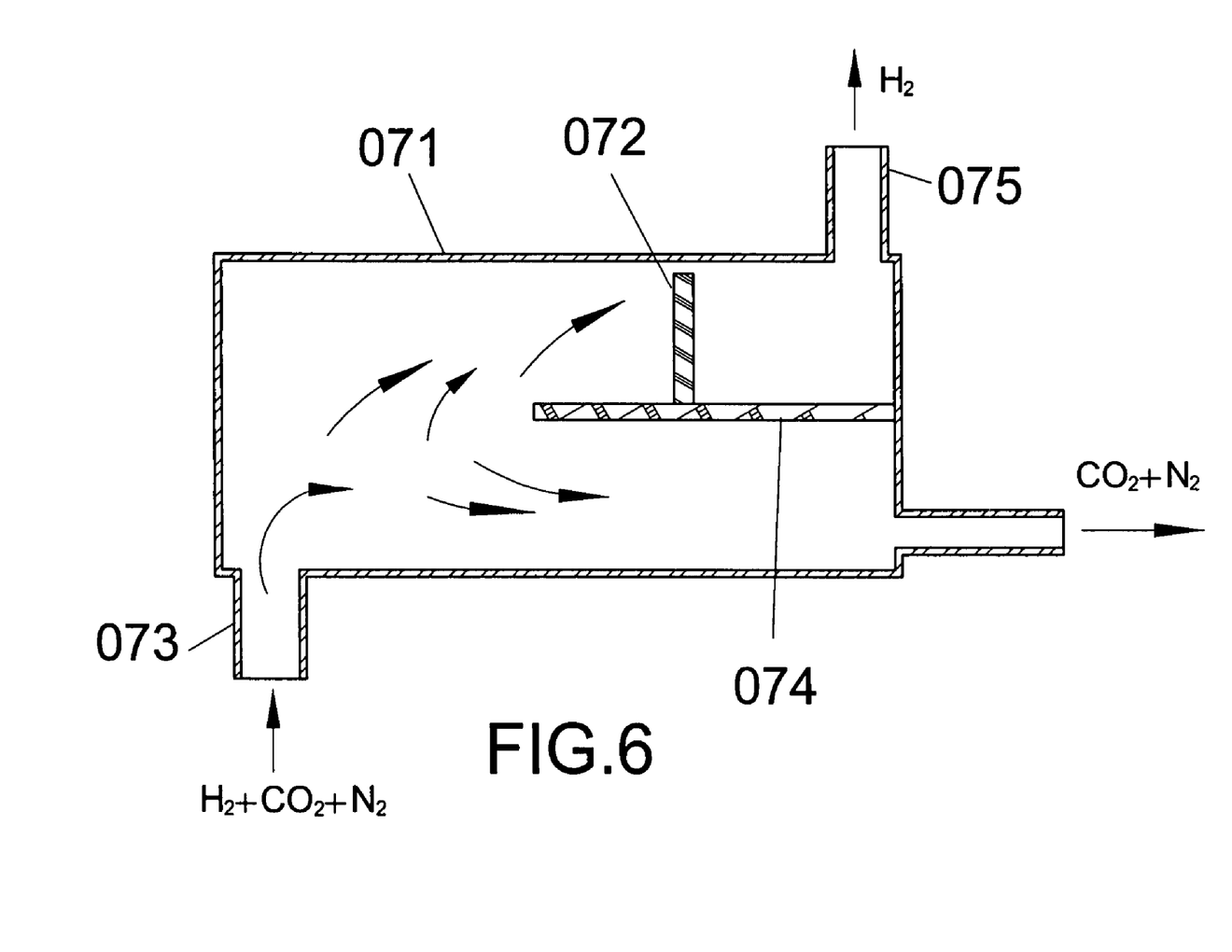
FIG. 6 is a diagram showing the structure of hydrogen separation unit.

After particulates of methanol aqueous solution pass through the catalyst reactor 05, the gases mixture ($H_2$, $CO_2$, $N_2$) full of $H_2$ then enter into hydrogen separation unit 07. As shown in FIG. 6, said hydrogen separation unit 07 is a conducting pipes 071, inside the conducting pipe 071, a hydrogen permeable membrane 072 is installed. Because the density of $N_2$ is 13.9 times of $H_2$, the density of $CO_2$ is 21.9 times of $H_2$, when said gases mixture enters into hydrogen separation unit 07 via a channel 073, hydrogen (H2) then floats on the upper level, by using the functions of isolating board 074, hydrogen is separated from $N_2$ and $CO_2$, and finally, hydrogen is filtered by said hydrogen permeable membrane 072, the obtained hydrogen ($H_2$) then flows out through hydrogen outlet 075.

Figure 7:
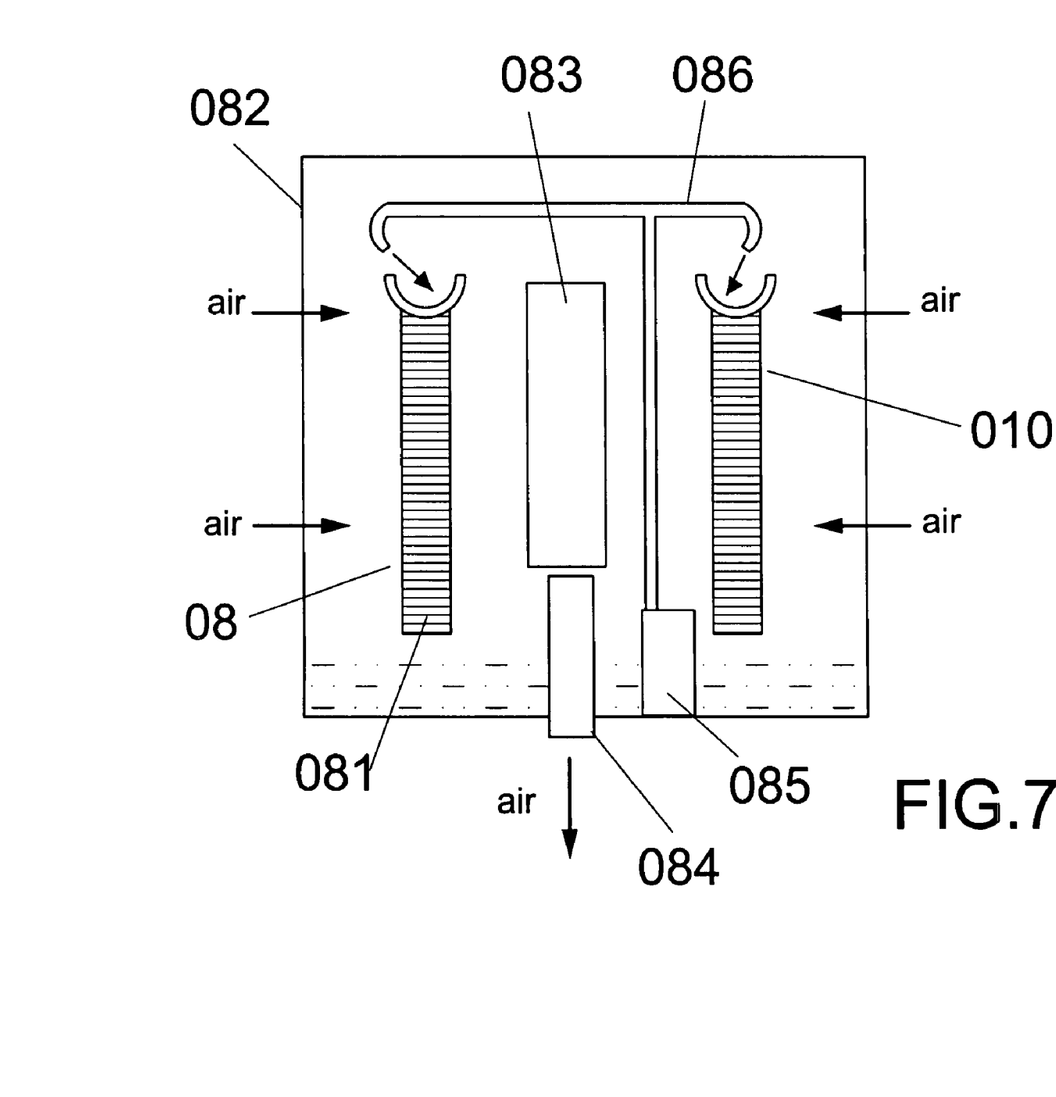
FIG. 7 is a diagram showing the structure of hydro-evaporating cooler.

As shown in FIG. 7, said the first hydro-evaporation cooler 08 and the second hydro-evaporation cooler 010 have the same structure. After $H_2$ flows out of said hydrogen outlet 075, it enters into the first hydro-evaporation cooler 08 to cool down, then compressed by hydrogen compressor 09, after it is cooled down by the second hydro-evaporation cooler 010 again, it is then injected into a hydrogen internal combustion engine or a hydrogen power generator for ublizabons as a fuel.

As shown in FIG. 7, said the first hydro-evaporation cooler 08 and the second hydro-evaporation cooler 010 are functioned that, when $H_2$ or air are flowing in air radiating pipe 081, the heat of $H_2$ and air are then radiated to inner wall of pipe 081, the air including evaporated steam then flows passing the casing 082 and absorbed into the cooler by a centrifugal fan 083, and then exhausted out of the cooler by air exhausting pipe 084, water then recyclingly ejected by water pump 085 and water distribution path 086, so as to achieve the function of temperature decreasing. The evaporated water is refilled by water tank 01.

The system of present invention can also comprise a programmable logic controller 011 for controlling the mixture ratio of methanol and water, controlling the generation of particulates from methanol aqueous solution. Starting air induction, controlling plasma collision heating and partial oxidation heating, controlling the hydrogen separation, hydrogen cooling, hydrogen compression, hydrogen injection into internal combustion engines or hydrogen power generators, and controlling air inlet, controlling hydrogen lean combustion of internal combustion engines or power generators, so as to achieve the reaction of formula (3): $4CH_3OH+3H_2O+\frac{1}{2}O_2 \rightarrow 4CO_2+11H_2$; and, controlling pressure sensor, temperature sensor, flow rate detector, liquid level controller, micro-valve, micro fan set, etc. to reach the optimal condition.

The system of present invention can also include a coil on plug ignition system 013 for providing hydrogen internal combustion engines or hydrogen power generators with high efficiencies of operations.

Figure 8:
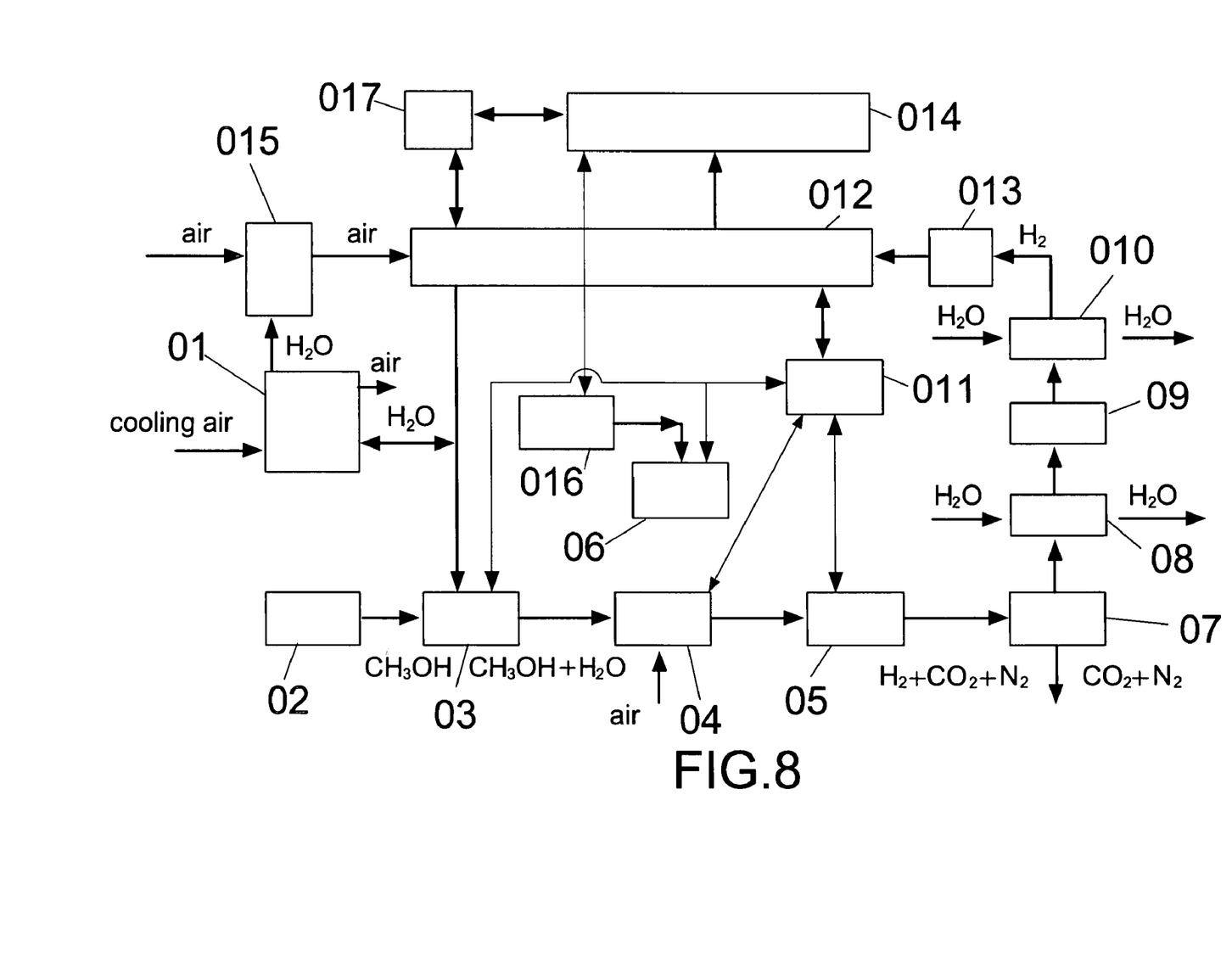
FIG. 8 is a diagram showing a system in combination of the present invention and a hybrid transmission system.

As shown in FIG. 8, the system of present invention can also be installed with a hybrid transmission system 014 for watching said energy generation units, so as to store the cruise and constant speed surplus horsepower, then supply starting horsepower to decrease efficiency loss or pollution of hydrogen internal combustion engine, and hydrogen power generator.

Also, the necessity of larger horsepower in climbing up a slope can be satisfied by the power from hybrid transmission system 014 and hydrogen internal combustion engine or hydrogen power generator 012, then the waste of energy pollution will be decreased.

Said hybrid transmission system 014 can be a modular hybrid transmission system produced by Ford Company, or another commercial system sold in market.

Regarding to the hydrogen compressor of, the diaphragm compressor produced by Sun Mines Electrics Co. is a proper one.

The system of present invention can include a vehicle inner air conditioner 015, the conditioner must provide the cooling effect to passengers and decrease the temperature of air to hydrogen internal combustion engine or hydrogen power generator. The cooled air is denser, giving the power generator a higher mass-flow rate and resulting in increased power generator output and efficiency. While the hydrogen injector can be a fuel injector of Quantum fuel system Inc. or a fuel injector commonly used in market.

The hydrogen internal combustion engine or hydrogen power generator 012 can be an internal combustion engine or turbine having modified functions of ignition timing, injection timing and positive crankcase ventilation, such that it is suitable for hydrogen.

The catalyst can be KATALCO 23-4 series of Nickel based catalyst having composition of: NiO:16 wt %, $SiO_2$<0.1% wt %, $SO_3$<0.05 wt %, $Al_2O_3$:balance), or KATALCO 25-4 series of Nickel based catalyst (having composition of: NiO: 18 wt %, $K_2O$:1.8 wt %, $SiO_2$<0.1% wt %, $Ca/Al_2O_3$:balance). Both of said catalysts are produced by Synetix corp.

The processes for composition of catalyst and honeycomb carrier are: mixing powder catalyst and adhesive agents to form a gel, then coating the gel onto ceramic or Fe—Cr—Al honeycomb carrier, and, heating the honeycomb under 450° C. for two hours.

The hydrogen permeable film can be a membrane produced by REB Research & Consulting Corporate, U.S.A.; or Argonne National Laboratory, U.S.A., or National Energy Technology Laboratory, Eltron Research, Inc., or the hydrogen transport membrane developed by ITN Energy Systems, Inc. The internal combustion engine can be a product of four stroke four valve injection engine on the HT12F1 series 125c.c. scooter, manufactured by SANYANG Industry CO., LTD (ROC) or other 4 stroke fuel injection engines with electronic control unit. Alternator VDN11401001 from Victory Industrial Corporation (ROC)

By the system of present invention, the following results can be obtained:

EXAMPLE 1

(A) The feed speed of methanol aqueous solution: 70 g/min.

(B) The inlet speed of air: 24.4 g/min.

(C) Ratio of molecular number of water/methanol: 0.8

(D) Temperature of catalyst steam reactor: 480° C.

Test result: By measurement of Gas Chromatograph and Float type flow meter, 64% of $H_2$, 23% of $CO_2$ and 12% of $N_2$ are obtained. The production rate of Hydrogen is 8 g/min.

EXAMPLE 2

(A) The feed speed of methanol aqueous solution: 140 g/min.

(B) The inlet speed of air: 52.6 g/min.

(C) Ratio of molecular number of water/methanol: 0.75

(D) Temperature of catalyst steam reactor: 440° C.

Test result: By measurement of Gas Chromatograph and Float type flow meter, 64.5% of $H_2$, 23.3% of $CO_2$ and 11.6% of $N_2$ are obtained. The production rate of Hydrogen is 17 g/min.

EXAMPLE 3

(A) The feed speed of methanol aqueous solution: 200 g/min.
(B) The inlet speed of air: 132.3 g/min.
(C) Ratio of molecular number of water/methanol: 0.6
(D) Temperature of catalyst steam reactor: 330° C.

Test result: By measurement of Gas Chromatograph and Float type flow meter, 59% of $H_2$, 22.3% of $CO_2$ and 18.1% of $N_2$ are obtained. The production rate of Hydrogen is 25 g/min.

EXAMPLE 4

(A) The feed speed of methanol aqueous solution: 440 g/min.
(B) The inlet speed of air: 228.6 g/min.
(C) Ratio of molecular number of water/methanol: 0.667
(D) Temperature of catalyst steam reactor: 330° C.

Test result: By measurement of Gas Chromatograph and Float type flow meter, 62.1% of $H_2$, 23.2% of $CO_2$ and 14.6% of $N_2$ are obtained. The production rate of Hydrogen is 53.5 g/min.

EXAMPLE 5

Hydrogen fuel supply system+

4 Valve 4 stroke injection engine of HN12F1 125 cc scooter+ alternator VDN11401001 (12 volt 140 Amp)

(A) The feed speed of methanol aqueous solution: 25 g/min.
(B) The inlet speed of air: 8.57 g/min.
(C) Ratio of molecular number of water/methanol: 0.75
(D) Temperature of catalyst steam reactor: 293° C.
(E) Hydrogen diaphragm compressor: 37.5 psi.

Test result: The measured electric voltage and current are: 12.2V, 142.7A.

In the system of present invention, the micro to nano sized particulates of methanol and steam are mixed to form super particulates, and then, are directly injected into spark plasma heater for heating. Said super particulates are able to increase contact area of chemical reaction as to several dozens times, thus the reaction speed is very fast. In addition to heating, the energy of spark plasma has the functions of converting the generated ions, electrons, neutrons, and radicals. Such that the reforming reaction of molecules of methanol and water will be accelerated, and, through the partial combustion and the reaction of catalyst reactor, the gases mixture of $H_2$, $N_2$ and $CO_2$ is obtained. Then the hydrogen is separated by hydrogen separation unit and then cooled by aqueous evaporating cooler, compressed by hydrogen compressor, and finally, supply to hydrogen internal combustion engines or hydrogen power generators. Because the generating speed of hydrogen is very fast, consequently, the produced hydrogen can be supplied to every kind of hydrogen internal combustion engines or hydrogen power generators.

According to the system of present invention, wherein, one end of the micro-particulates generator of methanol aqueous solution 03 is installed with a liquid level controller 035, its another end is connected to a water tank 01 and a methanol tank 02, a generated methanol aqueous solution particulates then enter into a catalyst reactor 05, and then separated by a hydrogen separation unit 07. Said one end of a catalyst reactor 05 is installed with spark plugs and is connected to spark ignition system 06, and a fan set 043 and an air inlet 041 are connected to said a programmable logic controller 011, the battery set 016 and power generator 017. Its volume is very small and occupies very small space, then it is easy to be utilized.

In conclusion, the hydrogen fuel supply system of present invention is characterized in that: A hydrogen fuel supply system comprising a methanol aqueous solution particulates generator, spark-plasma heater, catalytic reactor, hydrogen separation unit, hydro-evaporating cooler, hydrogen compressor, hydrogen injection system, etc. By properly mixing methanol and water to form a methanol aqueous solution, then vibrated by a methanol aqueous solution particulates generator to form micro to nano sizes particulates of aqueous methanol solution, and the micro to nano sizes particulates are then heated to a high temperature by a spark-plasma heater, then pass through a catalytic reactor to form a gaseous mixture of hydrogen, carbon dioxide, and nitrogen. Then the hydrogen is separated by a hydrogen separation unit. Finally, the hydrogen is chilled by a hydro-evaporation cooler and then compressed by a hydrogen compressor. The resulting hydrogen can be supplied to hydrogen internal-combustion engines or hydrogen power generators by hydrogen injection systems.

While several examples for carrying out the invention have been described, those familiar with the art to which this invention relates will recognize alternative designs and embodiments for practicing the invention. Thus, the above-described embodiments are intended to be illustrative of the invention, which may be modified within the scope of the following claims.

What is claimed is:

1. A hydrogen fuel supply system comprising:
   a water tank for storage of water;
   a methanol tank for storage of methanol;
   a programmable logic controller for controlling the mixture ratio of methanol and water;
   a methanol aqueous solution particulates generator including an oscillator and wherein said oscillator is a chip consisting of piezoelectric trasducers for oscillating a mixture of water and methanol to form methanol microparticulates wherein said methanol aqueous solution particulates generator is a micro-injector for outputting high frequency electric energy by said oscillator to convert the methanol aqueous solution into micro and nano sized mists with particulates of less than 3 μm;
   a spark plasma heater for heating said generated microparticulates;
   a catalyst reactor for reacting said heated methanol microparticulates to form a gaseous mixture of hydrogen, carbon dioxide and nitrogen;
   a hydrogen separation unit for separating hydrogen out of said gaseous mixture;
   a hydrogen cooler for decreasing the temperature of said separated hydrogen to reduce the activation of hydrogen;
   a hydrogen compressor for increasing the pressure of said separated hydrogen to increase the higher mass-flow rate; and
   an injection system for injecting said separated hydrogen into hydrogen engines as fuels and wherein the installation angle for said chip having functions of oscillators and piezoelectric transducers is adjustable between 6° to about 45° with respect to the corresponding position of the spark plasma heater adjacent to said chip; and
   wherein the volume ratio of said methanol in said methanol aqueous solution is controlled between 57.1% to about 75.5%, to control the optimal condition of $H_2$ production under proper temperature.

2. The hydrogen fuel supply system of claim 1, wherein said methanol micro-particulates of aqueous-methanol are injected into a plasma region formed due to discharging between electrode gaps of a spark plug, then the heating of plasma collision and combustion are performed, and the reaction is generated; such that the high temperature gases perform a further ionization, and re-organizing reaction is accelerated.

3. The hydrogen fuel supply system of claim 1, wherein said catalyst reactor uses Ni catalyst at an operating temperature of 300° C. to about 460° C.

4. The hydrogen fuel supply system of claim 3, wherein when said catalyst reactor operates under reaction conditions of 300° C. to about 460° C., 50 to about 300 μsec, and the micro-particulates of methanol aqueous solution shall produce 56.3 to about 65.1% $H_2$+20.7 to about 23.7% $CO_2$+11.1 to about 21.1% $N_2$.

5. The hydrogen fuel supply system of claim 1, in which said programmable logic controller has a control program for controlling a process.

6. The hydrogen fuel supply system of claim 1, wherein said system comprises a power supply to supply electricity needed by spark ignition and electric appliances.

7. The hydrogen fuel supply system of claim 1, wherein said system comprises a micro fan to provide oxygen needed for partial oxidation reaction.

8. The hydrogen fuel supply system of claim 1, wherein said system also comprises a gas inlet controller for precisely controlling the molecular ratio of air needed for partial oxidation reaction in the range of 25.3 to 44.2%.

9. The hydrogen fuel supply system of claim 1, wherein said system also comprises a battery package to store the electricity for starting.

10. The hydrogen fuel supply system of claim 1, wherein said system also comprises a ignition system for continuous ignition.

11. The hydrogen fuel supply system of claim 1, wherein said system also comprises a hydro-evaporation cooler for cooling hydrogen.

12. The hydrogen fuel supply system of claim 1, wherein said system also comprises at least one hydrogen compressor, to compress hydrogen after it is chilled by said cooler.

13. The hydrogen fuel supply system of claim 1, wherein said system also comprises at least one air conditioner to get denser air for higher mass-flow rate and resulting in increased power generator output and efficiency.

* * * * *